(12) United States Patent
Truong et al.

(10) Patent No.: US 9,618,976 B2
(45) Date of Patent: Apr. 11, 2017

(54) HINGED COMPUTER STAND THAT SLIDES UP AND DOWN ON A VIDEO DISPLAY

(71) Applicant: Lenovo (Singapore) Pte. Ltd., New Tech Park (SG)

(72) Inventors: Cuong Huy Truong, Cary, NC (US); Gerard Francis Muenkel, Raleigh, NC (US); Brian William Wallace, Wake Forest, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 499 days.

(21) Appl. No.: 14/101,587

(22) Filed: Dec. 10, 2013

(65) Prior Publication Data

US 2015/0160694 A1    Jun. 11, 2015

(51) Int. Cl.
| | |
|---|---|
| *H04N 5/645* | (2006.01) |
| *F16M 11/10* | (2006.01) |
| *F16M 13/00* | (2006.01) |
| *G06F 1/16* | (2006.01) |
| *H04N 5/655* | (2006.01) |

(52) U.S. Cl.
CPC .............. *G06F 1/166* (2013.01); *F16M 11/10* (2013.01); *F16M 13/005* (2013.01); *H04N 5/645* (2013.01); *H04N 5/655* (2013.01)

(58) Field of Classification Search
None
See application file for complete search history.

(56) References Cited

U.S. PATENT DOCUMENTS

| | | | | |
|---|---|---|---|---|
| 5,383,138 | A * | 1/1995 | Motoyama ................ | E05C 1/16 361/679.27 |
| 5,503,361 | A * | 4/1996 | Kan-O ................ | A47B 21/0314 248/456 |
| 5,682,182 | A * | 10/1997 | Tsubosaka ........ | G02F 1/133308 345/173 |
| 2005/0051693 | A1* | 3/2005 | Chu ..................... | F16M 11/046 248/371 |
| 2006/0117623 | A1* | 6/2006 | Watanabe ............. | F16M 11/00 40/606.15 |
| 2007/0018061 | A1* | 1/2007 | Ogawa .................. | F16M 11/10 248/166 |
| 2007/0194182 | A1* | 8/2007 | Lee ........................ | F16M 11/04 248/125.9 |
| 2012/0120628 | A1* | 5/2012 | Bliven ................. | F16M 11/041 361/807 |

FOREIGN PATENT DOCUMENTS

| | | | | |
|---|---|---|---|---|
| KR | 10-2007-0082793 | * | 2/2006 | ............... G06F 1/16 |
| KR | 10-2007-0082795 | * | 2/2006 | ............... G06F 1/16 |

* cited by examiner

*Primary Examiner* — Reza Aghevli
(74) *Attorney, Agent, or Firm* — John L. Rogitz; John M. Rogitz

(57) ABSTRACT

A computer display has an adjustable built-in stand with a slide portion that reciprocates in an opening in the rear of the display, and a support portion hingedly connected to the slide portion that extends rearwardly of the display and that supports the display in adjustable orientations, established by sliding the slide portion in the opening, ranging from the vertical or near vertical to the horizontal or near horizontal.

17 Claims, 3 Drawing Sheets

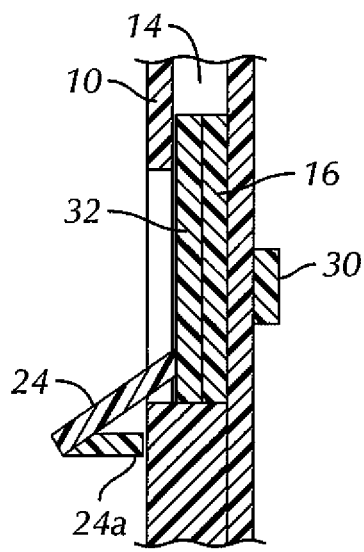
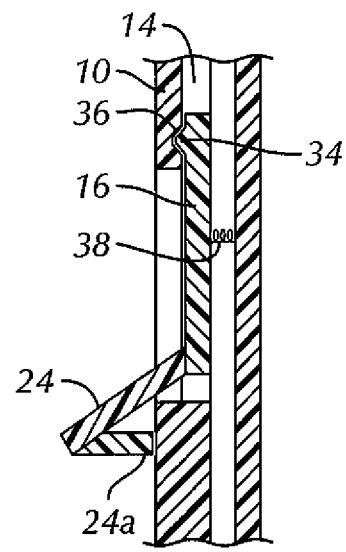
FIG. 4  FIG. 5
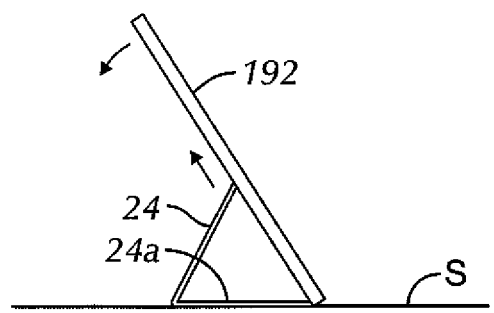
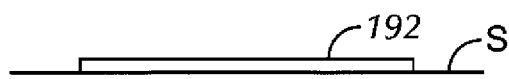
FIG. 6  FIG. 7
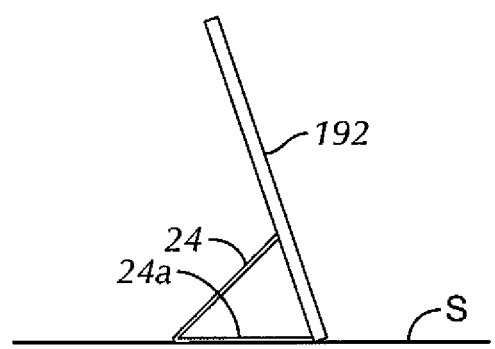
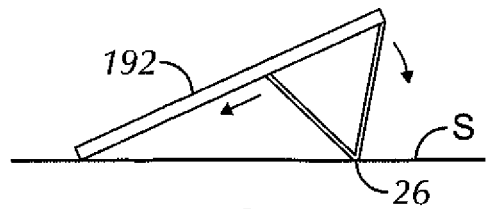
FIG. 8  FIG. 9

HINGED COMPUTER STAND THAT SLIDES UP AND DOWN ON A VIDEO DISPLAY

FIELD

The present application relates generally to hinged computer stands that attach and articulate on a display.

BACKGROUND

Computing systems such as small portable computers are often accompanied by computer stands for conveniently propping up the display.

SUMMARY

Present principles understand that when a display is used as a touch screen, it may be convenient to orient the display more horizontally, but when a separate keyboard is being used and the display is simply for viewing, a more vertical orientation may be convenient.

Accordingly, a system includes an information handling device which outputs video data, a video display having a front side and a rear side and which displays the video data, and a stand coupled to the rear side for supporting the display in plural tilt orientations relative to vertical. The stand includes a slide portion slidably engaged with an opening in the rear side, and a support portion coupled to the slide portion at a hinge so that the support portion can pivot about the hinge relative to the slide portion.

In some embodiments, the slide portion is constrained within the opening to remain parallel to the rear side. The slide portion may include opposed tongues on opposed side edges of the slide portion that slidably engage respective slots in the display. The tongues may extend only partially along their respective side edges or the tongues can extend along a complete length of the respective side edges of the slide portion.

In non-limiting examples the slide portion engages the opening in a close interference fit to resist motion of the slide portion in the opening. In addition or alternatively, a magnetic coupling is established between the slide portion and a part of the display to resist motion of the slide portion in the opening. In addition or alternatively, at least one protrusion on the slide portion or a part of the display and at least one cavity on the other of the slide portion and the part of the display are provided. The protrusion is biased toward the cavity to engage the cavity to resist motion of the slide portion in the opening.

In another aspect, a system includes a video display having a front side and a rear side and a stand coupled to the rear side for supporting the display in plural tilt orientations relative to vertical. The stand includes a slide portion slidably engaged with an opening in the rear side and a support portion coupled to the slide portion at a hinge wherein the support portion can pivot about the hinge relative to the slide portion.

In another aspect, an apparatus includes a computer display coupled to an information handling system. The computer display includes an adjustable built-in stand with a slide portion that reciprocates in an opening in the rear of the display, and a support portion hingedly connected to the slide portion that extends rearwardly of the display and that supports the display in adjustable orientations, established by sliding the slide portion in the opening, ranging from the vertical or near vertical to the horizontal or near horizontal.

The details of embodiments, both as to structure and operation, can best be understood in reference to the accompanying drawings, in which like reference numerals refer to like parts, and in which:

BRIEF DESCRIPTION OF THE DRAWINGS

FIG. 4 is a cross-sectional view as seen along the line 4-4 in FIG. 2, showing a magnetic braking method to impede but not prevent slidable motion of the slide portion;

FIG. 5 is a cross-sectional view as would be seen along the line 4-4 in FIG. 2, showing a detent and spring braking method to impede but not prevent slidable motion of the slide portion; and FIGS. 6-9 are schematic side drawings showing various display orientations afforded by the integrated support stand.

DETAILED DESCRIPTION

Figure 1:
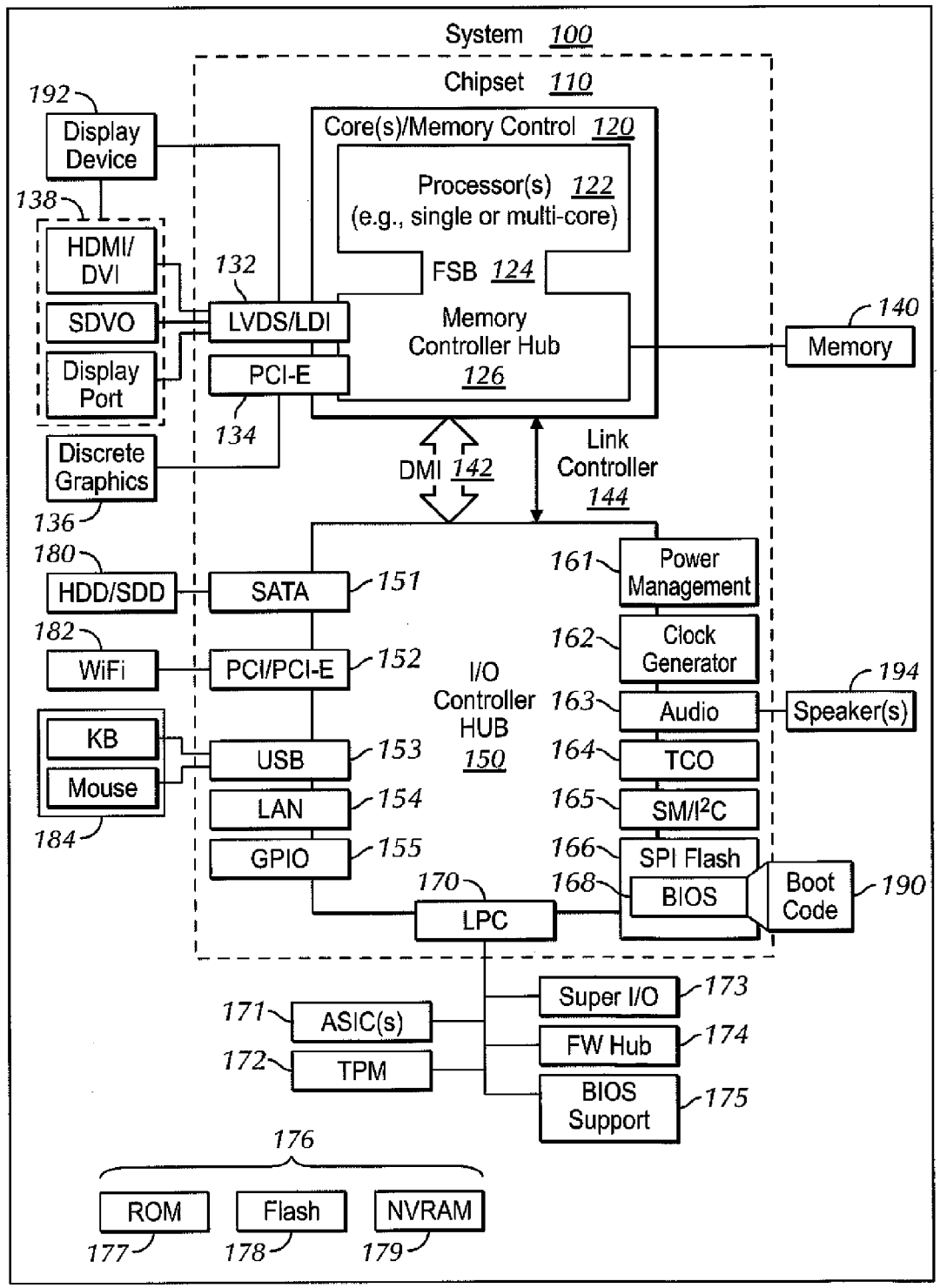
FIG. 1 is a block diagram of a system in accordance with present principles.

This disclosure relates generally to consumer electronics (CE) device based and/or workstation based user information. With respect to any computer systems discussed herein, a system may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the CE device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term"circuit" or"circuitry" is used in the summary, description, and/or claims. As is well known in the art, the term"circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now in reference to FIG. 1, a block diagram of an illustrative exemplary computer system 100 is shown. The system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory".

The memory controller hub 126 further includes a low-voltage differential signaling interface (LVDS) 132. The LVDS 132 may be a so-called LVDS Display Interface (LDI) for support of a video display apparatus 192 (including, e.g., a CRT, a flat panel, a projector, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card. An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface), a general purpose I/O interface (GPIO) 155, a low-pin count (LPC) interface 170, a power management interface 161, a clock generator interface 162, an audio interface 163 (e.g., for speakers 194), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes a basic input output system (BIOS) 168 and boot code 190. As used herein "BIOS" can mean BIOS in the traditional sense and also the newer standard for BIOS/unified extensible firmware interface (UEFI).

With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168. Again, as described herein, an exemplary client device or other machine may include fewer or more features than shown in the system 100 of FIG. 1.

Figure 2:
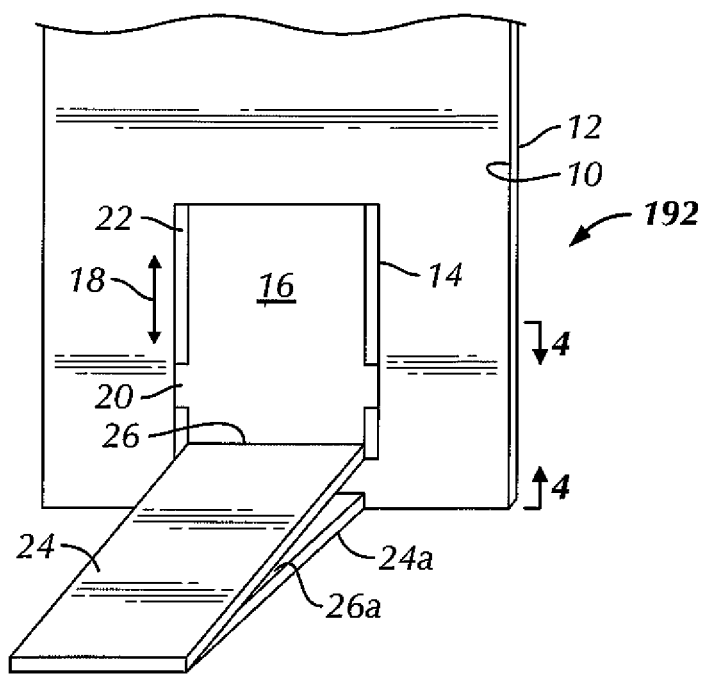
FIG. 2 is a perspective view of the back of the display with the slide portion pushed up in the opening to cause the stand portion to assume a small angle with respect to the horizontal, tilting the display to a more horizontal orientation, with portions broken away.
Figure 3:
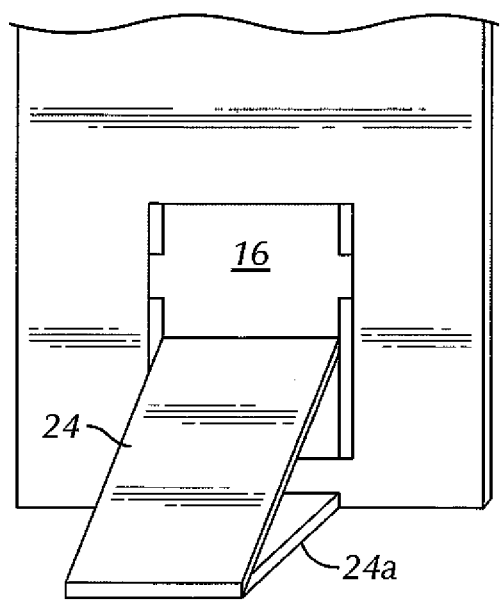
FIG. 3 is a perspective view of the back of the display with the slide portion pushed down in the opening to cause the stand portion to assume a larger angle with respect to the horizontal, tilting the display to a more upright orientation, with portions broken away.

FIG. 2 shows an embodiment of the system 100 shown in FIG. 1 is in which the display 192, which may be housed with one or more of the various components shown in FIG. 1, includes a rear surface 10 and an opposed front surface 12 which establishes the viewable video screen of the display. An opening 14, which may be rectilinear as shown, is formed in the rear surface 10. A slide portion 16 of a computer stand reciprocatingly slides within the opening 14 as indicated by the arrows 18.

The slide portion 16 is constrained within the opening 14 to remain parallel to the rear surface 10. In one embodiment, the slide portion 16 may be made integrally with or attached to opposed tongues 20 on each side edge of the slide portion 16 that slidably engage respective slots 22 in the display body. The tongues 20 may extend only partially along their respective side edges as shown or may extend the complete length of the respective side edge of the slide portion 16.

A support portion 24 of the computer stand is connected to the slide portion 16 at a hinge 26, so that the support portion can pivot about the hinge 26 relative to the slide portion 16. In some examples the support portion 24 is a first support portion which may be connected to a second support portion 24*a* at a hinge 26*a*. The edge of the second portion 24*a* may abut or even be affixed to the bottom of the display 192 and may be hingedly connected to the bottom of the display if desired.

The support portion 24 may be made integrally with the slide portion 16 and both may be made of injection-molded plastic, with the hinge 26 being established by a living hinge in the plastic material. The second support portion 24*a* may be made integrally with the first support portion 24 and both may be made of injection-molded plastic, with the hinge 26*a* being established by a living hinge in the plastic material. The support portion 24 may be made separately from the slide portion 16 in other embodiments and connected thereto by the hinge 26, which may be established by an appropriate hinge structure such as but not limited to a mechanical hinge with plural discrete elements such as a thin cylindrical rod that extends from and is parallel to an end of one portion 16, 24 and that engages plural small partial or complete rings on the facing edge of the adjacent portion, in rotatable engagement therewith. Other hinge structure may be used if desired. The first support portion 24 may be made separately from the second support portion 24*a* in other embodiments and connected thereto by the hinge 26*a*, which may be established by an appropriate hinge structure such as but not limited to a mechanical hinge with plural discrete elements such as a thin cylindrical rod that extends from and is parallel to an end of one portion 24*a*, 24 and that engages plural small partial or complete rings on the facing edge of the adjacent portion, in rotatable engagement therewith. Other hinge structure may be used if desired.

The slide portion and support portion may be made of metal or one may be plastic and the other metal.

In some embodiments, the user can apply gentle hand pressure to the slide portion 16 (or alternatively grasp and move the support portion 24 to push or pull the slide portion 16) to overcome the friction established by a close interference fit between the tongues 20 and slots 22. Absent user-induced motion, the friction is sufficient to prevent movement of the slide portion 16 in the opening 14.

In addition or in lieu of a close interference fit, slidable motion of the slide portion 16 in the opening 14 may be resisted magnetically. FIG. 4 shows that one or more magnets 30 (only a single magnet shown) may be disposed in the display on a side of the slide portion 16 that is opposite the opening 14, and another magnet or a ferromagnetic strip 32 may be positioned on the face of the slide portion 16 that faces the magnet 30. Or, the slide portion 16 itself may be made of a ferromagnetic material or be impregnated with ferromagnetic particles. Or, the magnet may be placed on the slide portion 16 to magnetically couple with ferromagnetic structure within the display. In any case, the magnetic coupling serves to resist slidable motion of the slide portion 16 in the opening 14.

In addition to or in lieu of any of the sliding resistance techniques described above, FIG. 5 shows that one or more protrusions 34 (only a single protrusion shown) may be attached to or formed integrally with the slide portion 16 to engage respective cavities 36 formed in the display. A coil or leaf spring 38 can be disposed between the display and the slide portion 16 to urge the slide portion 16 in a direction in which the protrusion 34 engages the cavity 36, to hold the slide portion 16 stationary relative to the opening 14. A person can push the slide portion 16 back against the spring 38 to distance the protrusion 34 from the cavity 36 and thereby permit slidable motion of the slide portion 16 within the opening 14. Multiple protrusions cooperating with multiple cavities (similar to ratchet teeth), or one protrusion cooperating with multiple cavities, or one cavity cooperating with multiple protrusions, may be used to establish and hold the slide portion 16 in multiple respective positions in the opening 14. The protrusions may be on the display and the cavities on the slide portion. The protrusions may be on the side edges of the slide portion instead of on a face thereof as shown, with corresponding cavities arranged along the side edges of the slide portion.

With the above in mind and referring to FIGS. 6-9, a user can slide the slide portion 16 up the opening 14, with the tongues 20 riding in the grooves 22, to cause the support portion 24 to pivot about the hinges 26, 26*a* as the support portion 24 rides against a surface to move toward a position in FIG. 6 that approaches the flat orientation shown in FIG. 7, in which a relatively small angle is established between the display and the surface. During movement of the first support portion 24, the second support portion 24a remains flat on the surface as shown. In this orientation, the display assumes a relatively tilted-toward-the-horizontal orientation with respect to the surface on which it is supported.

Or, the user may slide the slide portion 16 downward in the opening, with the tongues 20 riding in the grooves 22, with the cooperation of structure between the flat second support portion 24a and slide portion 16 causing the first support portion 24 to pivot about the hinges 26, 26a as the support portion 24 rides against a surface to cause the display to assume the relatively upright orientation shown in FIG. 8, in which a relatively larger angle (i.e., larger than the angle shown in the configuration of FIG. 6) is established between the display and the surface. In this orientation, the display assumes a relatively vertical orientation with respect to the surface on which it is supported. It may readily be appreciated that any number of display orientations, from the nearly upright (vertical) to the flat (horizontal) may be attained by sliding the slide portion 16 (and, hence, pivoting the support portion 24 to change its angle with respect to the horizontal) to an appropriate location in the opening 14. Indeed, FIG. 9 shows that the top edge of the display 192 may be tilted down against the support surface to invert the apparatus while still supporting the apparatus by the top edge of the display and the hinge 26.

While the particular HINGED COMPUTER STAND THAT SLIDES UP AND DOWN ON A VIDEO DISPLAY is herein shown and described in detail, it is to be understood that the subject matter which is encompassed by the present disclosure is limited only by the claims.

What is claimed is:

1. A system, comprising:
an information handling device which outputs video data;
a video display having a front side and a rear side and which displays the video data; and
a stand coupled to the rear side for supporting the video display in plural tilt orientations relative to vertical, the stand comprising:
a slide portion slidably engaged with an opening in the rear side such that the slide portion slides in a first plane parallel to a second plane established by at least one surface of the rear side; and
a support portion coupled to the slide portion at a hinge wherein the support portion can pivot about the hinge relative to the slide portion;
wherein the slide portion comprises opposed tongues on opposed side edges of the slide portion that slidably engage respective slots in the video display; and
wherein the tongues extend only partially along their respective side edges.

2. The system of claim 1, wherein the slide portion is constrained within the opening to remain parallel to the rear side when slid.

3. The system of claim 1, wherein the slide portion engages the opening in a close interference fit to resist motion of the slide portion in the opening.

4. The system of claim 1, wherein a magnetic coupling is established between the slide portion and a part of the display to resist motion of the slide portion in the opening.

5. The system of claim 1, comprising at least one protrusion on one of the slide portion and a part of the display, and comprising at least one cavity on the other of the slide portion and the part of the display such that the protrusion is biased toward the cavity to engage the cavity to resist motion of the slide portion in the opening.

6. A system, comprising:
a video display having a front side and a rear side; and
a stand coupled to the rear side for supporting the video display in plural tilt orientations relative to vertical, the stand comprising:
a slide portion slidably engaged with an opening in the rear side for the slide portion to slide along a plane established by at least a portion of the rear side; and
a support portion coupled to the slide portion at a hinge wherein the support portion can pivot about the hinge relative to the slide portion;
wherein the slide portion comprises opposed tongues on opposed sides of the slide portion that slidably engage respective slots in the video display; and
wherein the tongues extend at least partially along their respective sides.

7. An apparatus comprising:
a display coupled to an information handling system, the display comprising an adjustable built-in stand with a slide portion that reciprocates in an opening in the rear of the display, and a support portion hingedly connected to the slide portion that extends rearwardly of the display and that supports the display in adjustable orientations, established by sliding the slide portion in the opening, ranging from the vertical or near vertical to the horizontal or near horizontal;
wherein the slide portion comprises opposed tongues on opposed side edges of the slide portion that slidably engage respective slots in the display; and
wherein tongues extend along a complete length of the respective side edges of the slide portion.

8. The apparatus of claim 7, wherein the slide portion is constrained within the opening to remain parallel to a rear side of the display.

9. The apparatus of claim 7, wherein the slide portion engages the opening in a close interference fit to resist motion of the slide portion in the opening.

10. The apparatus of claim 7, wherein a magnetic coupling is established between the slide portion and a part of the display to resist motion of the slide portion in the opening.

11. The apparatus of claim 7, comprising at least one protrusion on the slide portion or a part of the display and at least one cavity on the other of the slide portion and the part of the display such that the protrusion is spring-biased toward the cavity to engage the cavity to resist motion of the slide portion in the opening.

12. The apparatus of claim 7, wherein the support portion comprises a first support portion and a second support portion hingedly connected to the first support portion via a living hinge, the second support portion having an edge distanced from the first support portion and juxtaposed with a bottom edge of the display.

13. The system of claim 1, wherein the support portion comprises a first support portion and a second support portion hingedly connected to the first support portion, the second support portion having an edge that is distanced from the first support portion and that is coupled to a bottom portion of the display.

14. The system of claim 6, wherein the stand is coupled to the rear side to assume angles less than ninety degrees with respect to horizontal while the display is supported by the stand in respective tilt orientations relative to vertical.

15. The system of claim 5, wherein the protrusion is spring-biased toward the cavity to engage the cavity to resist motion of the slide portion in the opening.

16. The system of claim 13, wherein the second support portion is hingedly connected to the first support portion via a living hinge.

17. The system of claim 13, wherein the second support portion is hingedly connected to the first support portion via a mechanical hinge comprising plural discrete elements.

\* \* \* \* \*